United States Patent [19]

Cherry

[11] Patent Number: 4,700,968
[45] Date of Patent: Oct. 20, 1987

[54] LIFTABLE AXLE WITH LOAD CONTROL

[75] Inventor: Herbert J. Cherry, Albion, Pa.

[73] Assignee: Lear Siegler, Inc., Santa Monica, Calif.

[21] Appl. No.: 848,977

[22] Filed: Apr. 7, 1986

[51] Int. Cl.[4] ............................................. B60G 11/26
[52] U.S. Cl. ..................................... 280/704; 180/290
[58] Field of Search .............................. 280/704, 104; 180/24.02, 209, 290

[56] References Cited

U.S. PATENT DOCUMENTS

| | | | |
|---|---|---|---|
| 3,499,663 | 3/1970 | Hedlund et al. | 280/704 |
| 4,141,430 | 2/1979 | Eddy, Jr. | 280/704 |
| 4,293,145 | 10/1981 | Taylor | 280/704 |
| 4,300,787 | 11/1981 | Vandenberg | 280/704 |

OTHER PUBLICATIONS

LSI Neway Art Series "Double Your Protection Against Damaging Shock & Vibration," copyright 1982.
Neway "Truck/Tractor Tag and Pusher Acle Air Suspensions".
Lord Industrial Products "Industrial Products Catalog" 1985 Pollak Electrical Controls.

*Primary Examiner*—John J. Love
*Assistant Examiner*—Ross Weaver
*Attorney, Agent, or Firm*—Varnum, Riddering, Schmidt & Howlett

[57] ABSTRACT

A load control (24) for a vehicle (10) having a frame (14), a load-bearing body (12) mounted on the frame (14) and rear wheel-bearing axles. The rear wheel-bearing axles support the frame (14) through suspension systems. The load control (24) selectively renders one of the rear axles non-load-bearing or load-bearing and includes a sensor for sensing a load between the load-bearing body (12) and frame (14) and an actuator for rendering one of the rear axles load-bearing when the load sensed by the sensor is above a predetermined level and for rendering the rear axle non-load-bearing when the load sensed by the sensor is below a predetermined level.

17 Claims, 10 Drawing Figures

4,700,968

LIFTABLE AXLE WITH LOAD CONTROL

BACKGROUND OF THE INVENTION

1. Field of the Invention

This invention relates to vehicles having selective load-bearing and non-load bearing axles. In one of its aspects, the invention relates to a means for controlling the load-bearing relationship of a liftable tandem axle in a vehicle.

2. Prior Art

Vehicles having a body located on a vehicle frame can have a plurality of rear wheel-bearing axles. These rear axles act to support the rear of the vehicle. Because the body is located generally toward the rear of the vehicle, and because the body can often be loaded with heavy loads, the rear axles must be suitable for supporting heavy loads. The use of multiple rear axles generally serves to distribute the load over the multiple axles, thereby reducing the load which must be supported by each individual rear axle.

Vehicles can include a liftable rear axle. Examples of liftable axle mechanisms are disclosed in the U.S. Pat. No. to Pierce, et al, 3,771,812, issued Nov. 13, 1973 and the U.S. Pat. No. to Taylor, 4,293,145, issued Oct. 6, 1981. Typically, these axles are provided with a suspension system between the axles and the frame. Suspension systems include a rigid trailing arm pivotably mounted to a frame bracket and an air spring between the trailing arm and the frame. The rear axle can be lowered to a ground-engaging position when the body is loaded or lowered so that the liftable axle, together with the other rear axle(s) supports the weight of the loaded body. The liftable axle can be lifted into a raised, non-ground engaging or non-load-bearing position when the body is unloaded or raised. The raising of the liftable rear axle into a raised position, when the vehicle body is empty, increases fuel efficiency and reduces tire wear.

Federal, sate or local regulations may require that the liftable rear axle be raised into a non-ground-engaging or non-load-bearing position only when the body is in an empty or raised condition. Conventional systems require the vehicle operator to manually control the positioning of the liftable rear axle. The operator may err and leave the rear, liftable axle in a raised or unloaded position even though the vehicle body is loaded or lowered. Thus, the operator's failure to lower the liftable rear axle into a ground-engaging or lowered position may cause the vehicle to be in violation of applicable regulations. The operator's failure to lower the liftable axle into a ground-engaging or load-bearing position when the body is loaded or lowered can also cause the remaining rear axle(s) to support an increased proportionate amount of the weight of the body. Thus, the remaining rear axle(s) can be loaded to an excessive degree, decreasing the life of the remaining rear axle(s) and decreasing the safety with which the vehicle can be operated.

SUMMARY OF THE INVENTION

According to the invention, there is provided a system for controlling the load-bearing relationship between an axle and a vehicle frame to automatically render the axle load-bearing when the load in the vehicle is above a predetermined amount and to render the axle non-load-bearing when the load on the vehicle is below a predetermined amount. The invention is used on a vehicle having a frame, a load-bearing body mounted on the frame and a plurality of wheel-bearing axles supporting a rear portion of the frame through suspension means. The suspension means has load control means for selectively rendering the one of the axles non-load-bearing or load-bearing. According to the invention, a sensor means is provided for sensing a load on the load-bearing body and an actuator means is coupled to the sensor means and to the load control means for rendering the one axle load-bearing when the load sensed by the sensor means is above a predetermined level and, conversely, for rendering the one axle non-load-bearing when the load sensed by the sensor means is below a predetermined level.

The sensor means preferably comprises a compressible means, for example, a rubber spring, which is positioned between the frame and the load-bearing body and which yields a pre-determined amount when the load on the load-bearing body is above a predetermined amount. Further, the actuator means preferably comprises a switch coupled to the load control means for applying a control signal to the load control means to render the axle load-bearing. Further, means couple the compressible means to the switch means for activating the switch means to generate the control signal when the compressible means yields by the predetermined amount.

In a preferred embodiment of the invention, the switch means comprises a horizontally-extending activating lever and the coupling means between the compressible means and the switch means comprises a plunger mounted at one end to an upper portion of the rubber spring and at another end to the lever so that the plunger can move downwardly and upwardly when the rubber spring is compressed and decompressed, respectively.

Typically, the suspension means includes an air spring between the one axle and the frame and the load control means comprises means to control the flow of compressed air to and exhaust of air from the air spring.

The invention typically is provided to a lift axle suspension in which the axle is raised to raise wheels on the axle from ground-engaging condition when the axle is in a non-load-bearing position and wherein the axle is lowered so that the wheels on the axle engage the ground to thereby partially support the frame when the axle is in the load-bearing condition. The lift mechanism can comprise a coil spring lift or an air spring lift.

The invention also contemplates a method for controlling the movement of a suspension system to render the suspension system load-bearing or non-load-bearing in a vehicle having a number of tandem load-bearing axles. The method comprises sensing a load on the vehicle and rendering the axle non-load-bearing when the load on the vehicle is below a predetermined amount and rendering the axle load-bearing when the load on the vehicle is above a predetermined amount.

BRIEF DESCRIPTION OF THE DRAWING

The invention will now be described with reference to the drawings in which.

DETAILED DESCRIPTION OF DRAWINGS

Figure 2:
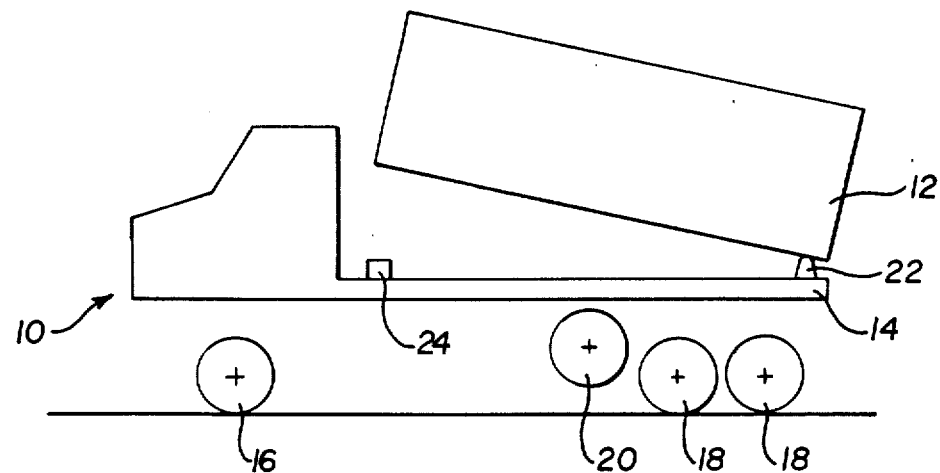
FIG. 2 is a schematic representation of a truck having a body in a raised or unloaded position.

With reference to the drawings and, in particular, with reference to FIG. 2, a vehicle 10 is shown having a body 12 and a vehicle frame 14. Body 12 can be a dump body pivotably mounted at a rear end thereof to frame 14 by a pivot mount 22. Body 12 can also comprise various other types of vehicle bodies such as cement mixers, refuse packers, truck beds, and the like. Vehicle 10 further has a front ground-engaging wheel 16 and rear ground-engaging wheel 18 adapted by means of suspension systems to remain in continuous contact with the ground or road. Vehicle 10 also comprises a rear wheel 20 which is adapted by means of a suspension system to be raised when body 12 is in a raised or unloaded condition. A load control 24 is located on vehicle frame 14 adjacent to a forward end of body 12.

As shown in FIG. 2, rear wheel 20 is in a raised, non-ground-engaging position when body 12 is in a raised position. It will be understood that, where vehicle body 12 comprises a vehicle body such as a bed which is not pivotably mounted to vehicle frame 14, rear wheel 20 will be in a raised, non-ground-engaging position when body 12 is in a non-loaded condition. In that situation, the position of body 12 depicted in FIG. 2 is a schematic representation of the non-loaded condition of the body 12. It should be further understood that rear wheel 20 can remain in contact with the ground or road at all times, the rear wheel 20 being in a non-load-bearing condition when vehicle body 12 is in a raised, or non-loaded position. In that situation, the rear wheel 20 depicted in FIG. 2 schematically represents the non-loaded condition of real wheel 20.

Figure 3:
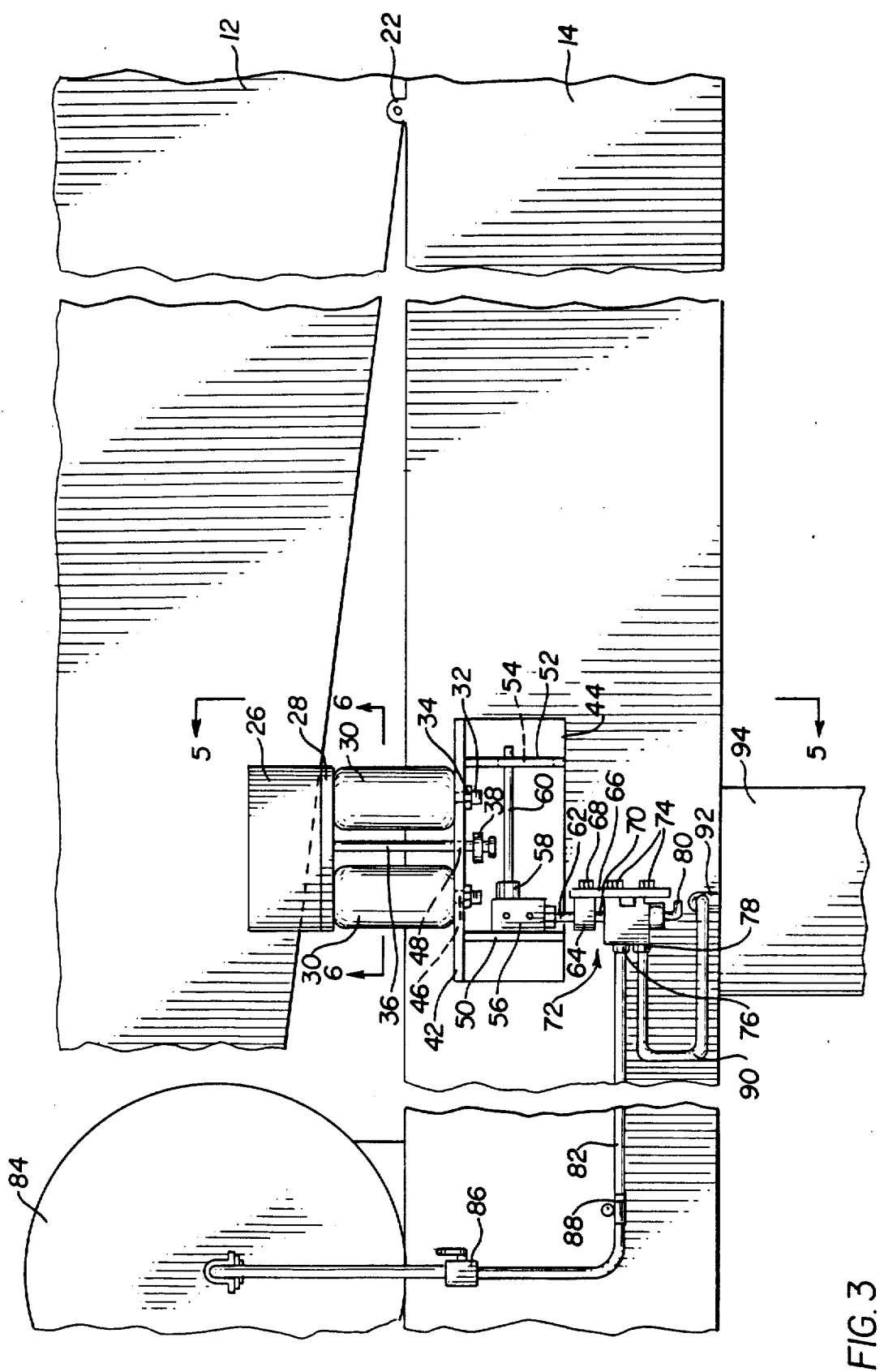
FIG. 3 is a partial side view of the vehicle having a load control system according to the invention wherein a body is in a raised or unloaded position.
Figure 5:
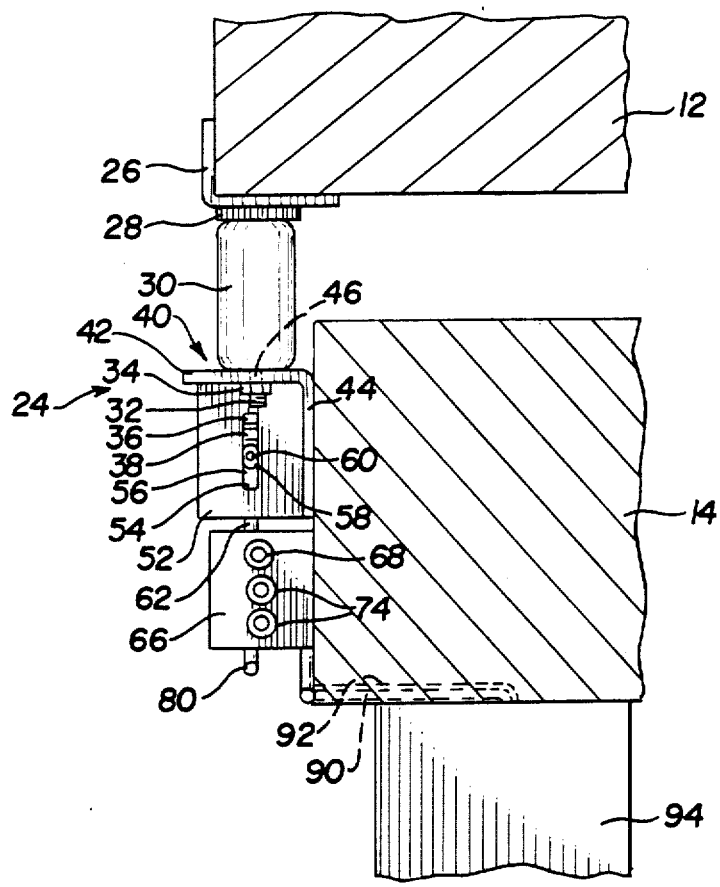
FIG. 5 is a sectional view taken along line 5—5 of FIG. 3.

As shown in FIGS. 3 and 5, load control 24 comprises an L-shaped mounting bracket 26 secured, as by welding, to a lower side of a forward portion of body 12. A top plate 28 comprising a substantially flat metal plate is mounted beneath the mounting bracket 26. Top plate 28 rests upon a pair of rubber cushions 30. Rubber cushions 30 preferably are Lord sandwich mounts, number J-5425-27, made of natural rubber. The Lord sandwich mounts are described at page 76 of the 1985 *Industrial Products Catalog* of Lord Industrial Products, a division of Lord Corporation. In the event the Lord sandwich mounts are not used, however, any suitable mount can be used which provides an adequate degree of flexibility and resiliency. Cushions 30 have a threaded stud extending from a lower end thereof for securing cushions 30 to a switch housing 40 which is, in turn, welded to vehicle frame 14. In this manner, rubber cushions 30 are disposed between top plate 28 and switch housing 40. A nut 34, corresponding to each threaded stud 32, is further provided to secure cushion 30 to switch housing 40.

A plunger 36 comprising an elongated pole is secured to top plate 28 and extends downwardly therefrom between the rubber cushions 30. Plunger 36 has a broad fitting 38 at a lower end thereof.

Switch housing 40 comprises an L-shaped metal plate or bracket having a top plate 42, a back wall 44, a forward vertical plate 50, and a rear vertical plate 52. Switch housing top plate 42 extends outwardly from vehicle frame 14 and provides a horizontal surface for supporting rubber cushions 30. Switch housing top plate 42 has circular apertures extending therethrough adapted to receive threaded studs 32 extending downwardly from rubber cushions 30. In addition, switch housing top plate 42 has a central circular aperture through which 36 extends.

Switch housing back wall 44 is secured as by welding to vehicle frame 14 and is secured to, or integral with, switch housing top plate 42. Thus, switch housing top plate 42 and back wall 44 together form an L-shaped bracket wherein switch housing top plate 42 provides a rigid, horizontal surface which remains stationary relative to vehicle frame 14.

A forward vertical plate 50 is secured as by welding to back wall 44 and switch housing top plate 42 and extends outwardly from back wall 44 to provide structural integrity to switch housing 40 by supporting switch housing top plate 42. Forward vertical plate 50 also provides a surface upon which a switch mechanism 56 can be mounted. Switch housing 40 also comprises a rear vertical plate 52 secured as by welding to back wall 44 and switch housing top plate 42 and extending outwardly from back wall 44 parallel to forward vertical plate 50. Rear vertical plate 52 provides structural integrity to switch housing 40 in the same manner as does forward vertical plate 50. Rear vertical plate 52 has a vertical slot 54 extending therethrough adapted to receive an end of a toggle lever 60 of switch mechanism 56.

Switch mechanism 56 is mounted by screws (not shown) to a rear face of forward vertical plate 50. Switch mechanism 56 is a toggle-type microswitch having a toggle 58 and a toggle lever 60 extending rearwardly therefrom. Switch mechanism 56 can be a Pollak universal back-up switch, number 41-702, as described in Pollak *Electrical Controls* brochure, Joseph Pollak Corporation, an Allegheny International Company, 195 Freeport Street, Boston, Mass. 02122. If the Pollak back-up switch is not used, however, any suitable switch may be used which can be adapted to be activated by movement of plunger 36. Toggle lever 60 extends rearwardly from toggle 58 on switch mechanism 56. As shown in FIG. 3, toggle switch 60 extends beneath the broad fitting 38 on plunger 36. An end of toggle switch 60 extends through slot 54 in rear vertical plate 52.

A first lead 62 connects switch mechanism 56 to a solenoid 64. Solenoid 64 is mounted to vehicle frame 14 by means of a frame bracket 66 which is secured, as by welding, to vehicle frame 14. Frame bracket 66 is a rectangular, metal plate extending outwardly from vehicle frame 14. Solenoid 64 is secured to frame bracket 66 by a bolt 68.

A second lead 70 connects solenoid 64 to a first pilot valve 72. Pilot valve 72 is a valve having an inlet 76 adapted to receive a flow of pressurized air, an outlet 78 adapted to permit a flow of pressurized air out of pilot valve 72, and an exhaust port 80 adapted to permit air to be expelled from pilot valve 72 into the environment. Pilot valve 72 is a valve of conventional construction and is adapted so that the direction of airflow through the various ports can be controlled through solenoid 64. Pilot valve 72 is secured to vehicle frame 14 by means of bolts 74 which secure pilot valve 72 to frame bracket 66.

A first air line 82 connects inlet 76 to an air reservoir 84. Air reservoir 84 can be, in turn, connected to an air compressor (not shown). A hand valve 86 can be mounted in air line 82 to provide a shut-off control to the airflow through air line 82. Hand valve 86 can be mounted on the vehicle frame 14, as shown in FIG. 3, or it may be mounted inside a cab of vehicle 10, depending upon the preferred location and the applicable safety regulations. A pressure gauge 88 can also be mounted in air line 82 to monitor the pressure in air line 82.

A second air line 90 is provided to connect outlet port 78 of pilot valve 72 to air springs 94 of an air spring suspension system. The air spring suspension system can be of a type similar to that disclosed in the U.S. Pat. No. to Pierce, et al 3,771,812 issued Nov. 13, 1973 wherein a coil spring exerts a force for lifting a raisable axle and wheel upon relief of pressure in an air spring. In the alternative, the suspension system can comprise a suspension similar to that disclosed in Pierce, et al U.S. Pat. No. 3,771,812, but having a second air spring instead of a coil spring for exerting a force for lifting an axle and wheel upon the relief of pressure in the first air spring.

As may be seen in FIG. 5, mounting bracket 26 has an L-shaped configuration and is secured, as by welding, to an outer side of body 10. As can further be seen in FIG. 5, top plate 28 is secured beneath mounting bracket 26 and above rubber cushion 30. Rubber cushion 30 is, in turn, mounted on top of an outwardly extending horizontal surface formed by switch housing top plate 42. As depicted in FIGS. 3 and 5, mounting bracket 26 is in contact with top plate 28. It should be understood that where vehicle body 12 is a dump body or similar vehicle body being pivotably mounted to vehicle frame 14, mounting bracket 26 can be raised a vertical distance above top plate 28 so that mounting bracket 26 and top plate 28 do not contact.

As can also be seen by FIG. 5, load control 24 is secured to a side of vehicle frame 14 so as to be beneath vehicle body 12. Body 12 typically overhangs vehicle frame 14. Only one load sensor 24 need be utilized with each vehicle 10. Where, as shown in FIG. 5, load control 24 is mounted at one side of vehicle frame 14, a mounting bracket 26, top plate 28, rubber cushions 30, and a switch housing 40 may be provided on an opposite side (not shown) of vehicle frame 14. It is not necessary, however, for load control 24 to be mounted at a side of vehicle frame 14. Instead, a single load control 24 can be mounted to a central portion of vehicle frame 14 beneath a forward portion of body 12.

As can further be seen in FIG. 5, air line 90 is connected to air spring 94 in a manner so that air spring 94 supports vehicle frame 14. As depicted in FIG. 5, air line 90 can extend through a channel 92 in vehicle frame 14 to reach air spring 94.

Figure 6:
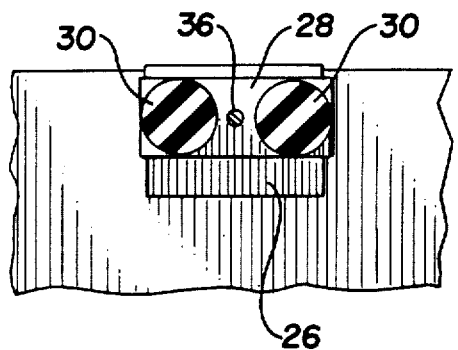
FIG. 6 is a sectional view taken along line 6—6 of FIG. 3.

As can be seen in FIG. 6, rubber cushions 30 are circular in cross-section and have a generally cylindrical appearance. It should be understood that any suitably resilient compressible support such as coil springs can be used in place of rubber cushions 30. In addition, it should be understood that rubber cushions 30 need not be configured in the pair arrangement shown in FIG. 6 and, instead, can consist of a single rubber cushion 30 or a plurality of rubber cushions. Plunger 36 is mounted between rubber cushions 30.

Figure 8:
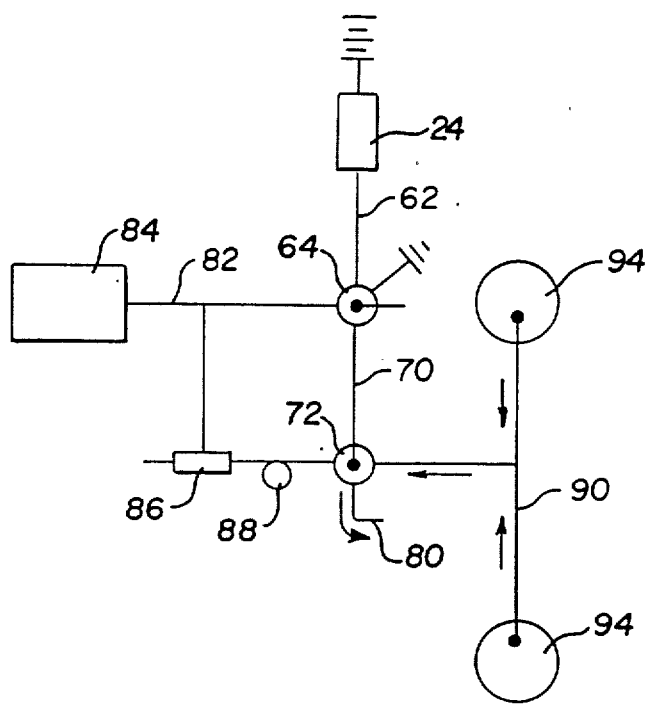
FIG. 8 is a schematic representation of air flow in a coil spring suspension according to the invention wherein a body is in a raised or unloaded position.

FIG. 8 is a schematic representation of a vehicle suspension system according to the invention where the arrows represent the direction of airflow when vehicle body 12 is in a raised or non-loaded condition. As shown in FIG. 8, when vehicle body 12 is in a raised or non-loaded condition, pilot valve 72 is opened so that air pressure in air springs 94 can enter pilot valve 72 through outlet port 78 and exhaust into the environment through exhaust port 80. In this condition, inlet port 76 of pilot valve 72 is closed so that the pressurized air exiting air springs 94 does not enter the remainder of the suspension system. The suspension system in FIG. 8 schematically depicts a coil lift suspension system similar to that disclosed in Pierce, et al U.S. Pat. No. 3,771,882, issued Nov. 13, 1973.

Figure 10:
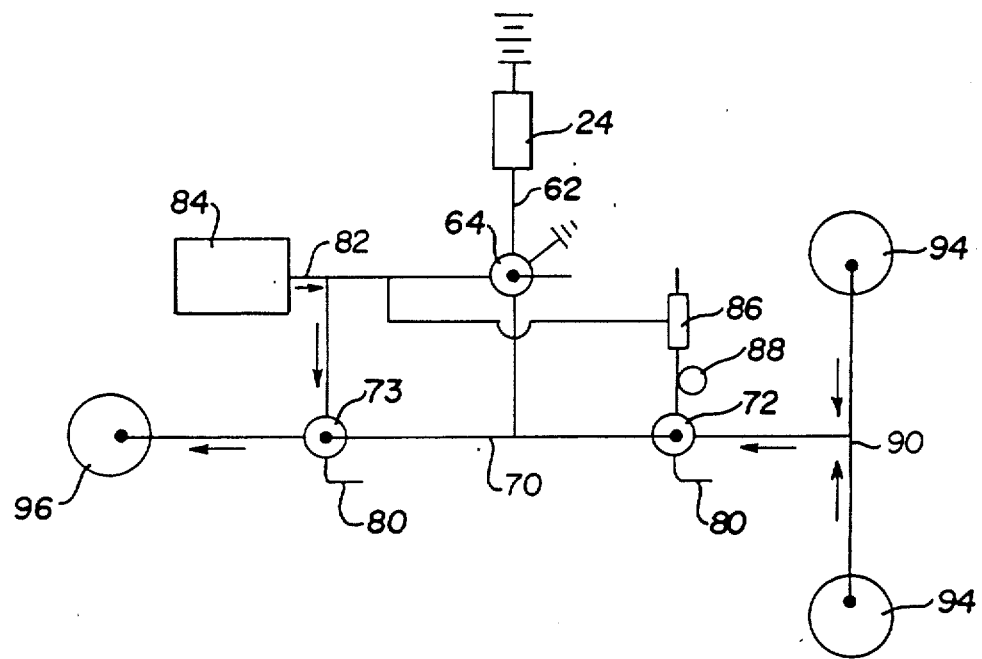
FIG. 10 is a schematic representation of air flow in an airlift suspension according to the invention wherein a body is in a raised or unloaded position.

FIG. 10 is a schematic representation of a suspension system according to the invention wherein an air spring lift is utilized in place of the coil spring of the type of suspension disclosed in Pierce, et al, U.S. Pat. No. 3,771,882. The arrows in FIG. 10 schematically represent the direction of airflow when vehicle body 12 is in a raised or non-loaded condition. As can be seen in FIG. 10, pressurized air is permitted to exit air springs 94 through pilot valve 72 and out exhaust port 80 in a manner similar to that depicted in FIG. 8. Simultaneously, pressurized air is caused to exit an air reservoir 84 and to pass through a second pilot valve 73 similar in construction to pilot valve 72 and is permitted to inflate a second air spring 96.

Figure 1:
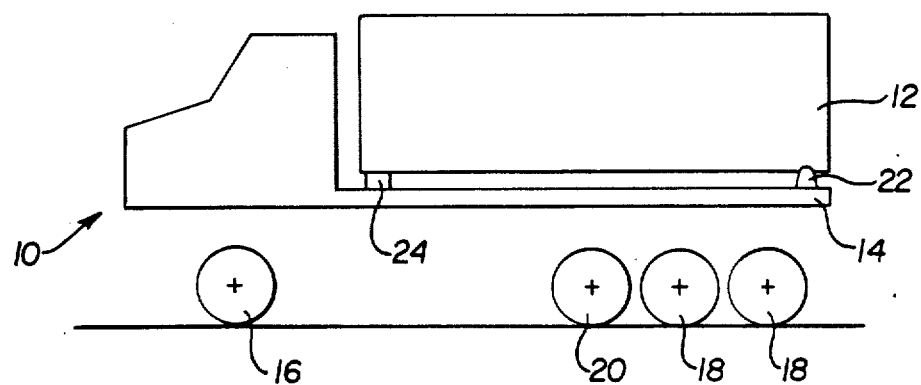
FIG. 1 is a schematic representation of a truck having a body in a lowered or loaded position.

Thus, when vehicle body 12 is in a raised or unloaded condition, no downward pressure is exerted on an axle (not shown) bearing rear wheel 20 by air springs 4. Instead, the axle (not shown) bearing rear wheel 20 is maintained in a raised, or non-loaded, condition by a force exerted by either a coil spring (not shown) or an air spring 96. FIG. 1 depicts a vehicle similar to the vehicle depicted in FIG. 2, where said vehicle 10 is in a lowered, or loaded, condition. It will be understood that the schematic representation of vehicle 10 in FIG. 1 represents the forward position for vehicles 10 having vehicle bodies 12 of a raisable type such as dump bodies and certain types of cement mixers and the like. It will also be understood that the schematic representation of vehicle 10 in FIG. 1 represents a loaded position for vehicles which do not have a pivotable or raisable body 12.

Figure 4:
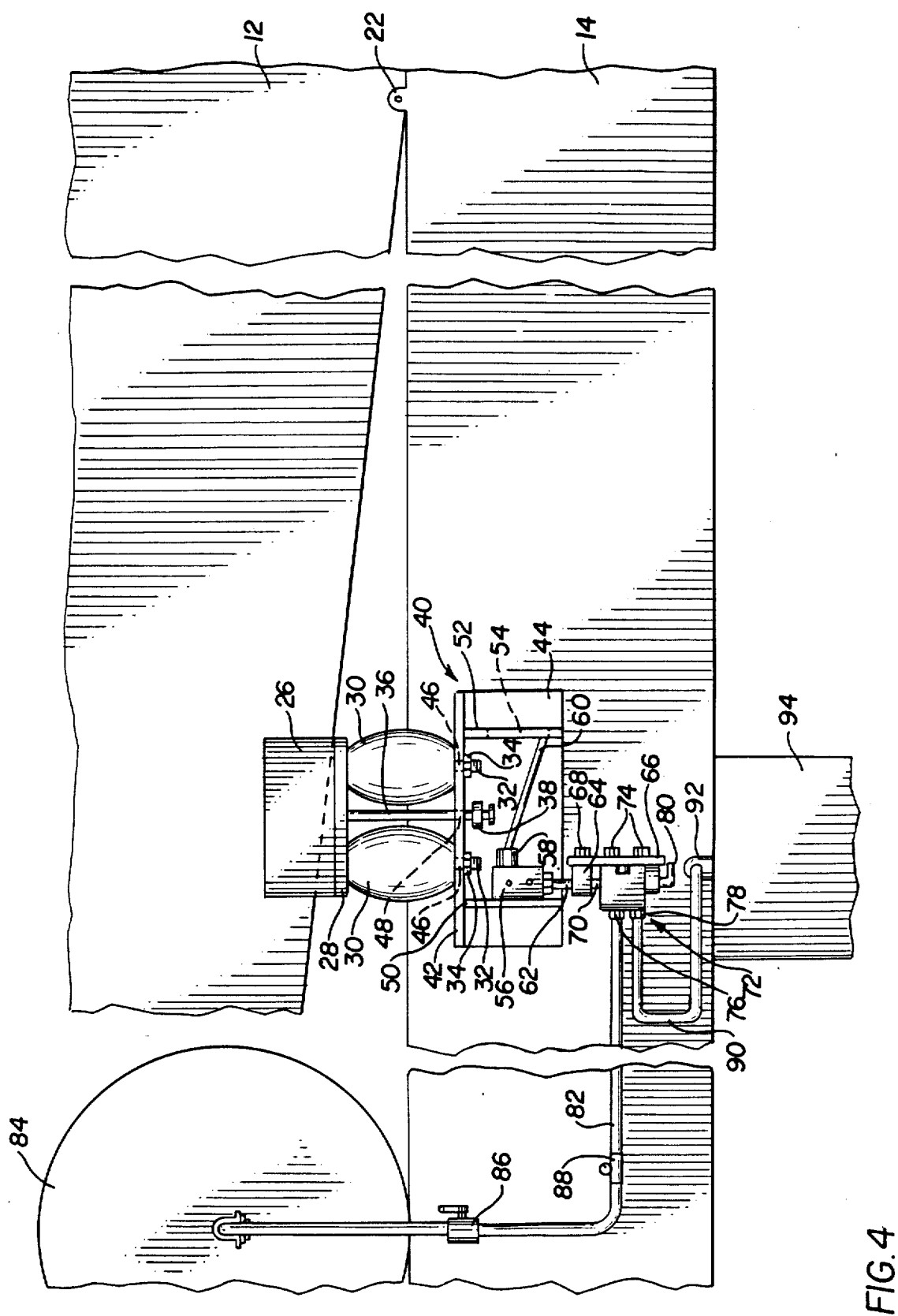
FIG. 4 is a partial side view of a vehicle having a load control system according to the invention wherein a body is in a lowered or loaded position.

As shown in FIG. 4, vehicle body 12 is in a loaded or lowered position. It will be understood that for vehicles having a raisable vehicle body 12, FIG. 4 represents the condition wherein vehicle body 12 has been lowered so that mounting bracket 26 contacts top plate 28 and a portion of the weight of vehicle body 12 and its load are brought to bear downwardly on top plate 28. It will further be understood that in vehicles having a vehicle body 12 which is not raisable, FIG. 4 shows vehicle body 12 in a loaded condition wherein the load in vehicle body 12 increases the downward force of frame bracket 26 against top plate 28, thereby compressing rubber cushions 30.

As the lowered or loaded condition of vehicle frame 12 increases the downward force of frame bracket 26 against top plate 28, it can be seen that rubber cushions 30 are compressed. As shown in FIG. 4, rubber cushions 30 bulge outwardly slightly as they are compressed, but without interfering with plunger 36. As rubber cushions 30 are compressed, their vertical height lessens, thereby allowing top plate 28 to move downwardly with respect to vehicle frame 14. As top plate 28 moves downwardly, plunger 36 is also moved downwardly through the central aperture in switch housing top plate 42. As can further be seen in FIG. 4, as plunger 36 is moved downwardly, broad fitting 38 at the end of plunger 36 is adapted to contact toggle lever 60 and move toggle lever 60 downwardly. In this manner, toggle 58 is activated and, in turn, switch mechanism 56 is activated.

When switch mechanism 56 is activated, a signal produced by switch mechanism 56 is carried to solenoid 64 through lead 62. Solenoid 64 is thereby activated and, in turn, controls the operation of pilot valve 72 through lead 70.

Figure 7:
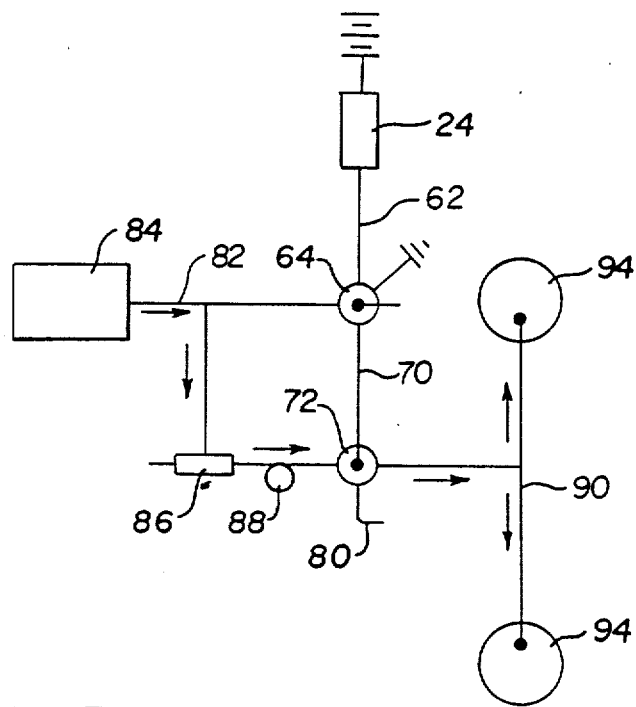
FIG. 7 is a schematic representation of air flow in a coil spring suspension system according to the invention wherein a body is in a lowered or loaded position.

FIG. 7 is a schematic representation of a coil lift suspension system similar to that disclosed in the U.S. Pat. No. to Nichol, et al 3,771,812 issued Nov. 13, 1973, and having a load control according to the invention. The arrows in FIG. 7 depict the direction of airflow when the vehicle body 12 is in a lowered or loaded condition. As depicted in FIG. 7, the solenoid 64 is controlled by an impulse produced by the switch mechanism 56 in load control 24. As can be seen in FIG. 7, the electrical power for the switch and solenoid are provided by a battery located in the vehicle. As can further be seen in FIG. 7, solenoid 64 controls pilot valve 72 so that, when vehicle body 12 is in a lowered or loaded condition, inlet port 76 of pilot valve 72 opens, outlet port 78 of pilot valve 72 opens, and exhaust port 80 of pilot valve 72 closes so that pressurized air is permitted to flow from air reservoir 84 through hand control valve 86, past pressure gauge 88, through pilot valve 72, and into air springs 94. In this manner, air springs 94 are inflated. The inflation of air springs 94 produces a downward force sufficiently large to overcome the counterforce exerted by the coil spring (not shown). Thus, the axle (not shown) bearing rear wheel 20 is forced downward into a load-bearing, ground-engaging position.

Figure 9:
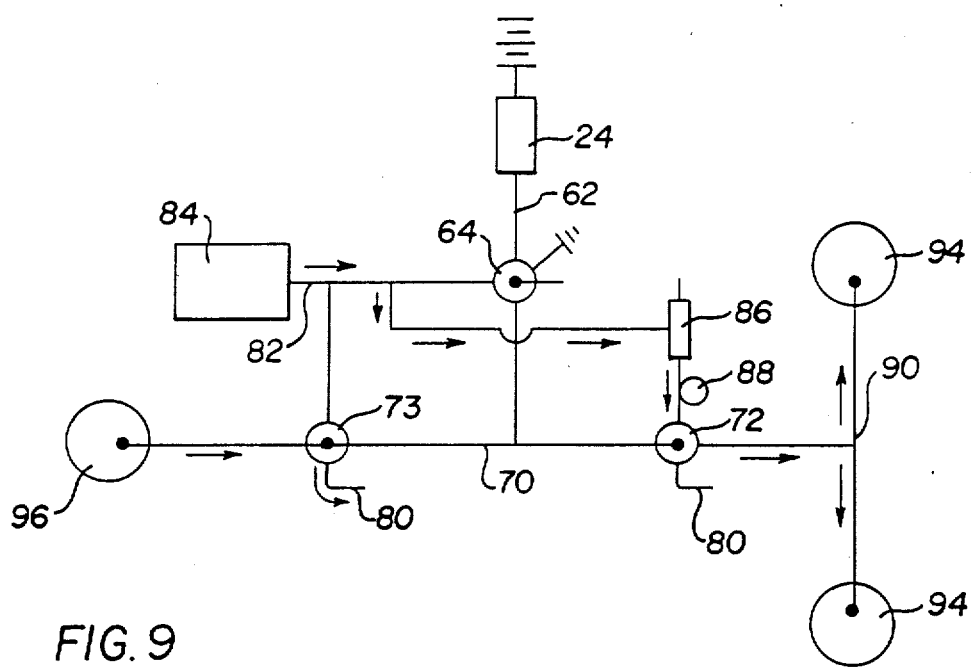
FIG. 9 is a schematic representation of air flow in an airlift suspension system according to the invention wherein a body is in a lowered or loaded position.

FIG. 9 is a schematic representation of the airflow in a suspension system having an air spring adapted to provide an upward force on an axle (not shown) bearing rear wheel 20 and further having a load control 24 according to the invention. The arrows in FIG. 9 represent the direction of airflow in the suspension system when vehicle body 12 is in a lowered, or loaded condition. As can be seen in FIG. 9, when vehicle body 12 is in a lowered, or loaded, condition, solenoid 64 is controlled by a signal produced by switch mechanism 56 in load control 24. In turn, solenoid 64 controls pilot valves 72 and 73. When vehicle body 12 is in a lowered, or loaded condition, pilot valve 72 is open and exhaust port 80 closed as previously discussed so that pressurized air is permitted to flow from air reservoir 84, through hand control valve 86, past pressure gauge 88, through pilot valve 72, and into air springs 94. In this manner, air springs 94 are inflated and a downward pressure is exerted on an axle (not shown) bearing real wheel 20.

Simultaneously, solenoid 64 controls a second pilot valve 73 so that pilot valve 73 closes at its inlet and opens at its exhaust port 80 so that the pressurized air within air spring 96 is permitted to pass through pilot valve 73 and into the atmosphere through exhaust port 80. In this manner, air spring 96 is permitted to deflate. Air spring 96, which exerts an upward force on an axle (not shown) bearing rear wheel 20 when vehicle body 12 is in a raised, or non-loaded, condition, is thereby permitted to deflate when vehicle body 12 is in a lowered, or loaded, condition. In this manner, the axle (not shown) bearing rear wheel 20 is permitted to be lowered into a loaded, ground-engaging condition.

Whereas the invention has been described with reference to a body 12 having a liftable axle, the invention also is applicable to other vehicles of load-carrying capacity. Further, the invention is applicable to load suspension systems in which the axle may not be raised but merely rendered non-load bearing by exhausting air from an air spring. In addition, the invention has been described with reference to a load control mounted to a vehicle frame 14. The invention can also be mounted to vehicle body 12.

While particular embodiments of the invention have been shown, it will be understood that the invention is not limited thereto and reasonable modifications and variations are possible without departing from the spirit of the invention.

The embodiments of the invention in which an exclusive property or privilege is claimed are defined as follows:

1. In a vehicle having a frame, a load-bearing body mounted on the frame and a plurality of wheel-bearing axles at a rear portion of the frame and supporting the frame through suspension means, said suspension means having load-control means for selectively rendering one of said axles non-load-bearing or load-bearing, the improvement which comprises:

a sensor means for sensing a load on said load-bearing body, said sensor means comprising at least one rubber spring which yields a predetermined amount when the load on said load-bearing body is above a predetermined amount; and actuator means coupled to said sensor means and to said load cotnrol means for rendering said one axle load-bearing when the load sensed by said sensor means is above a predetermined level and for rendering said one axle non-load-bearing when the load sensed by said sensor means is below a predetermined level.

2. The improvement of claim 1 wherein the actuator means comprises a switch means coupled to said load control means for applying a control signal to said load control means to render said axle load-bearing; and means coupling the rubber spring to the switch means for activating the switch means to generate the control signal when the rubber spring yields by said predetermined amount.

3. A vehicle according to claim 2 wherein said switch means has a horizontally-extending activating lever; and said means coupling the rubber spring the switch means comprises a plunger mounted at one end to the upper portion of said rubber spring and to said lever at another end thereof so that said plunger can move downwardly and upwardly when said rubber spring is compressed and uncompressed, respectively.

4. The improvement of claim 2 wherein said suspension means includes an air spring between said one axle and said frame and said load control means comprises means to control the flow of compressed air to and exhaust of air from said air spring.

5. The improvement of claim 1 and further comprising means to lift said one axle to raise ground-engaging wheels thereof from contact with the ground when said axle is rendered non-load-bearing.

6. The improvement of claim 5 wherein said lift means comprises a coil spring.

7. The improvement of claim 5 wherein said lift means comprises a second air spring.

8. The improvement of claim 1 wherein said suspension means includes an air spring between said one axles and said frame and said load control means comprises means to control the flow of compressed air to and the exhaust of air from said air spring.

9. The improvement of claim 8 wherein said lift means comprises a coil spring.

10. The improvement of claim 8 wherein said lift means comprises a second air spring.

11. A system for controlling the load-bearing relationship between an axle and the frame in a vehicle having a frame, a load-bearing body mounted to the frame and a plurality of wheel-bearing axles supporting a rear portion of the frame through suspension means, the suspension means having a load control means for selectively rendering said one axles non-load-bearing and load-bearing, the system which comprises:

a sensor means for sensing a load on said load-bearing body, said sensor means comprising at least one rubber spring which yields a predetermined amount when the load on said load-bearing body is above a predetermined amount; and actuator means coupled to said sensor means and to said load control means for rendering said one axle load-bearing when the load sensed by said sensor means is above non-load-bearing when the load sensed by said sensor means is below a predetermined level.

12. The control system according to claim 11 wherein the actuator means comprises a switch means coupled to the load control means for applying a control signal to the load control means to render the axle load-bearing; and means coupling the rubber spring to the switch means for activating the switch means to generate the control signal when the rubber spring yields by the predetermined amount.

13. The control system according to claim 12 wherein the switch means has a horizontally-extending activating lever; and said means coupling the rubber spring the switch means comprises a plunger mounted at one end to an upper portion of said rubber spring and to said lever at another end so that said plunger can move downwardly and upwardly as said spring is compressed and decompressed, respectively.

14. In a vehicle having a frame, a load-bearing body mounted on the frame and a plurality of wheel-bearing axles at a rear portion of the frame and supporting the frame through suspension means, said suspension means having load-control means for selectively rendering one of said axles non-load-bearing or load-bearing, a sensor means; and actuator means coupled to said sensor means and to said load control means for rendering said one axle load-bearing when the load sensed by said sensor means is above a predetermined level and for rendering said one axle non-load-bearing when the load sensed by said sensor means is beow a predetermined level, the improvement which comprises:

said sensor means being positioned between said frame and said load-bearing body.

15. The improvement of claim 14 wherein said sensor means comprises a compressible means which yield a predetermined amount when the load on said load-bearing body is above a predetermined amount.

16. The improvement of claim 15 wherein the actuator means comprises a switch means coupled to said load control means for applying a control signal to said load control means to render said axles load-bearing; and means coupling the compressible means to the switch means for activating the switch means to generate the control signal when the compressible means yields by a predetermined amount.

17. The improvement of claim 14 wherein the compressible means comprises at least one rubber spring.

* * * * *

UNITED STATES PATENT AND TRADEMARK OFFICE
CERTIFICATE OF CORRECTION

PATENT NO. : 4,700,968

DATED : October 20, 1987

INVENTOR(S) : HERBERT J. CHERRY

It is certified that error appears in the above-identified patent and that said Letters Patent is hereby corrected as shown below:

Column 6, line 43, "4." should be --94.--

Column 6, line 47, before "FIG. 1" begin a new paragraph.

Column 8, line 64, after "spring" insert --to--

Column 9, line 8, "1" should be --4--

Column 9, line 17, "axles" should be --axle--

Column 9, line 39, after "axle" delete "."

Column 9, line 41, after "above" insert --a predetermined level and for rendering said one axle--

Column 10, line 27, "beow" should be --below--

Signed and Sealed this

Fifth Day of July, 1988

Attest:

DONALD J. QUIGG

Attesting Officer

Commissioner of Patents and Trademarks